Patented June 15, 1937

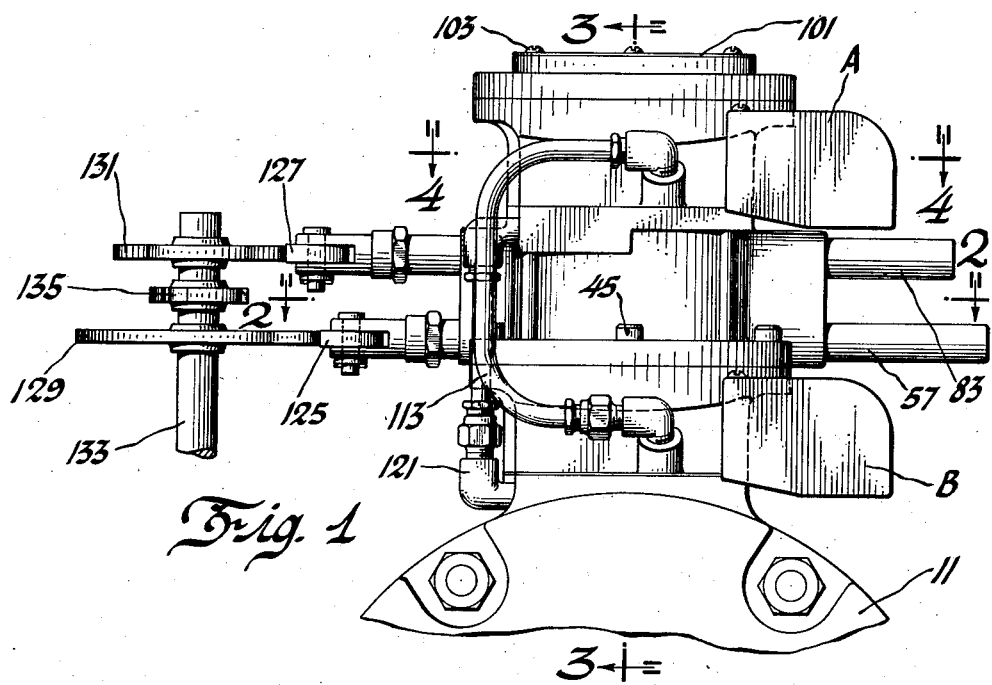
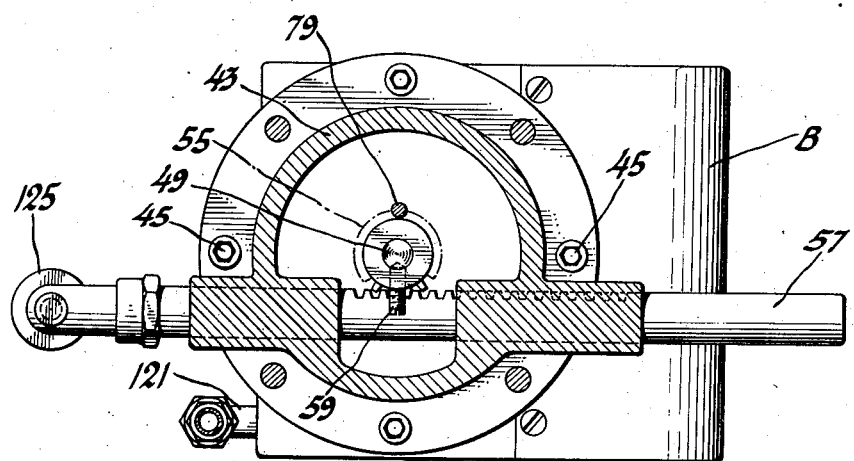
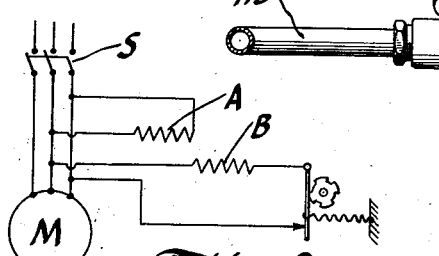

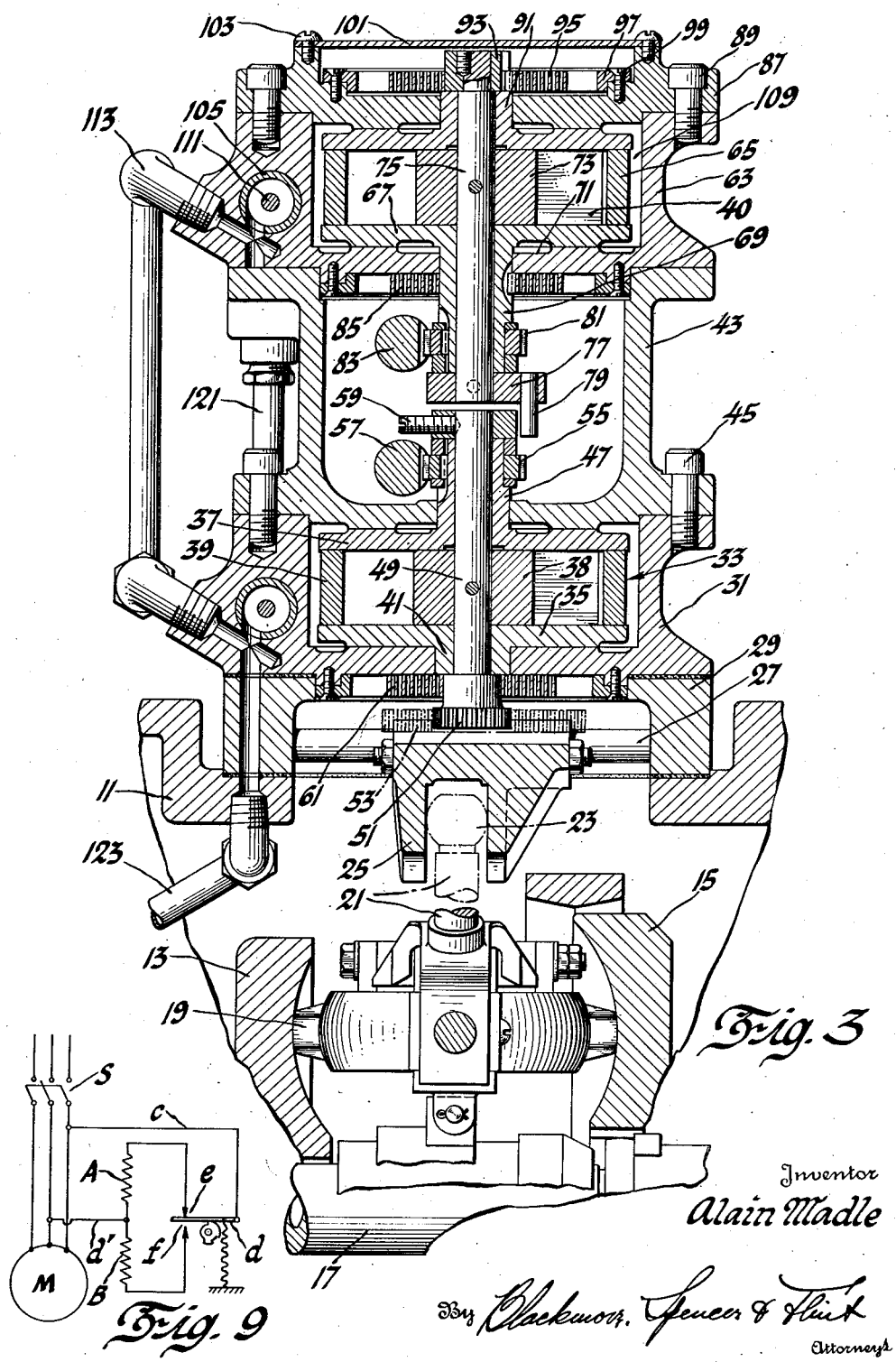

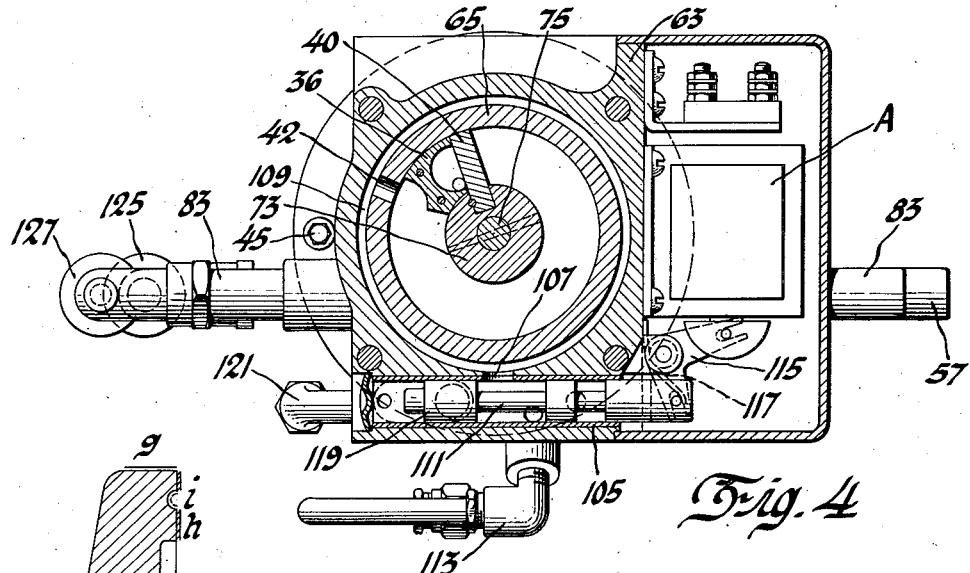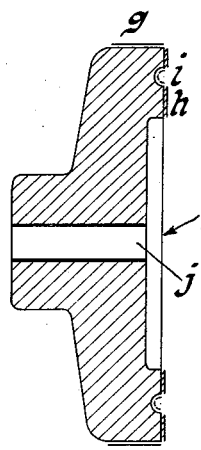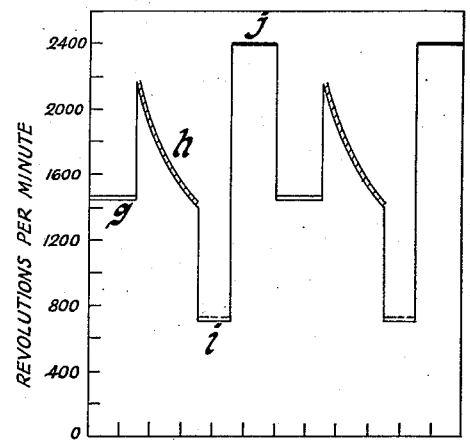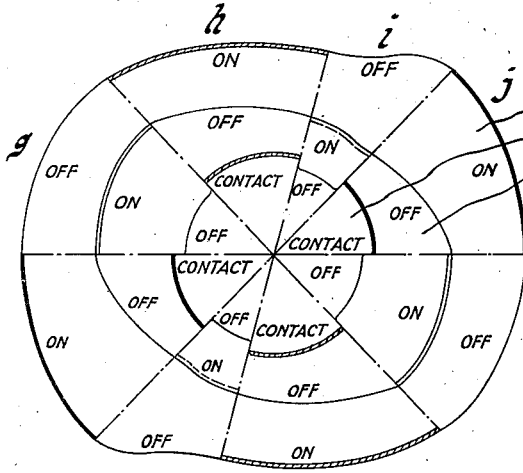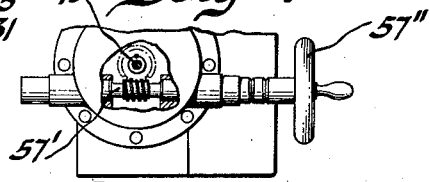

2,083,656

UNITED STATES PATENT OFFICE 2,083,656

CONTROL OF VARIABLE SPEED TRANSMISSION

Alain Madlé, Bristol, Conn., assignor to General Motors Corporation, Detroit, Mich., a corporation of Delaware Application July 2, 1936, Serial No. 88,553

11 Claims. (Cl. 74—190.5)

This invention relates to devices for controlling the ratios afforded by change speed transmission. It has been designed to control the speed ratio of the transmission part of an industrial unit comprising a motor and a variable speed transmission.

An object of the invention is to provide a control which may render quickly available a change from relatively high speeds to relatively low speeds and vice versa.

Another object is to provide automatic mechanism to make the ratio changes.

Other objects and advantages will be understood from the following description.

The invention may be referred to as an improvement over an application of my own for Variable speed power transmission control, Serial Number 695,145, filed October 25, 1933.

In the present application as in the prior applications, there is employed with the motor of the industrial unit a variable speed transmission of the race and roller type and the rollers are shifted relative to the races to change the rate of rotation of the output shaft. In the earlier cases the changes were made by hand, operating through the instrumentality of a hydraulic medium. Substantially the same kind of hydraulic control is herein shown but, in a preferred form, instead of the ratio changes being made by hand they are made automatically, the rate of change being directly responsive to the character of the work being performed. In some work, it will be appreciated that it may be necessary to make a rapid shift from operations employing uniform or variable low speeds to operations requiring high speeds and vice versa. The shift is easily accomplished by my present invention, particularly when accompanied by the automatic mechanism. To that end the invention makes use of a cooperating pair of such control devices as before referred to, each of which may be and preferably is automatically controlled.

The invention will be better understood from the following description when read with the accompanying drawings. Upon these drawings:

Fig. 1 is a view in elevation of a part of the change speed element of the industrial unit together with the novel control.

Fig. 2 is a section on line 2—2 of Fig. 1.

Fig. 3 is a vertical section on line 3—3 of Fig. 1.

Fig. 4 is a transverse section on line 4—4 of Fig. 1.

Fig. 5 is a diagrammatic view of a piece of "work" which has been operated upon by tools of a lathe, the "work" being driven by the output shaft of the transmission mechanism.

Fig. 6 is a diagrammatic view of several cams showing their relation the one to the other.

Fig. 7 is a chart to illustrate the action of the cams.

Fig. 8 and Fig. 9 are diagrams to show two electric circuit arrangements either of which may be used to carry out the inventive idea.

Fig. 10 is a detail showing manual operation.

Referring by reference characters to the drawings, numeral 11 is used to designate the housing of the change speed transmission element, the input shaft of which (not shown) is rotated by the motor as usual. There is no novelty to be claimed per se in the transmission mechanism and it will be but briefly described. In Fig. 3 the input race 13 is rotated by the motor and race 15 functions to rotate output shaft 17. Numeral 19 represents one of several rollers the angular position of which relative to the races determines the speed ratio imparted to the output shaft by the motor shaft and input race 13. The carrier for each roller is moved to effect the changing ratio by an arm 21 terminating in a ball-shaped head 23 positioned between the bifurcations of a member 25 sliding on a rod 27. The rod is carried by a base 29 mounted in any convenient way on housing 11. Reciprocation of member 25 on rod 27 thus rocks the roller carrier and changes the ratio.

Housing 31 encloses a lower control member. It is secured upon the base in any convenient way. Within housing 31 is rotatable a hollow control element 33. It comprises a bottom 35, a top 37, and an annular wall 39. The bottom has a boss 41 rotatable within the bottom wall of the housing 31. Within the hollow control element 33 is a rigid partition not shown but like partition 36 shown in Fig. 4. A rotary hub 38 is formed with a vane like vane 40 of Fig. 4. The annular space between the wall 39 and the adjacent wall of housing 31 communicates with the space within the cup 33 and on one side the partition by means of an opening like opening 42 of Fig. 4.

Above housing 31 is a second hollow housing 43 secured to housing 31 by fastening means 45. Journaled in the bottom of housing 43 is a boss 47 extending up from cover 37, which boss carries a pinion 55 engaging teeth on a rack bar 57 slidably guided in the wall of member 43. Journaled in bosses 41 and 47 is a spindle 49 pinned to hub 38. This spindle extends down into base 29 where it carries a pinion 51 meshing with a rack 53 on sliding member 25. Above pinion 51 there is a spring 61 suitably anchored to the bottom of housing 31 and attached to the spindle. This spring is designed to rotate the spindle and pinion 51 to reciprocate the member 25 in a direction to shift roller 19 toward its low ratio position The spindle extends up into the second housing 43 where it is provided with a collar from which projects a threaded pin 59. Secured to the second housing 43 and above the same is a third housing 63. Housing 63 is a second control member. Within housing 63 is a second hollow control element 65 like element 33 in housing 31. The bottom wall 67 of element 65 has a boss 69 journaled in the base 71 of housing 63. Within the control element 65 is a hub 73 like hub 38. The partition 36 and vane 40 have already been mentioned. The spindle 75 secured to hub 73 extends down through and beyond the end of boss 69 and to its extreme end is secured a collar 77 carrying an axially directed pin 79 adapted to engage with pin 59 in a way to be later described. Above collar 77 and on the hollow boss 69 is a pinion 81 having teeth engaged by the teeth of a second rack 83. A spring 85 is connected to boss 69 and to the bottom wall of housing 63. A cap 87 is secured by fastening means 89 to the open top of housing 63. Journaled in the cap is a boss 91 extending up from the top wall of control element 65. The spindle 75 extends through and beyond the upper end of boss 91. To its extremity is secured a collar 93 to which is secured one end of a spring 95 the other end of which is attached as by a ring 97 and screw 99 to the cap 87. A cover 101 is secured to the cap by fastening means 103.

Each of the control members 31 and 63 is provided with valve means controlled by a solenoid. A description of one will be sufficient. Referring to Fig. 4, it will be seen that housing 63 is formed with a bore having therein a sleeve 105. Within the sleeve is an opening 107 communicating by means of annular space 109 and opening 42 with the space within cup 65 on one side of vane 40. Reciprocable within the sleeve 105 is a valve 111 having an intermediate part of reduced diameter whereby fluid under pressure may pass from inlet conduit 113 through a corresponding opening in the sleeve 105 and then through opening 107 into the annular space 109, and through opening 42 into the cup and push the vane against the partition. The valve is moved to this position by a solenoid shown only diagrammatically and marked by letter A. The solenoid performs this function through the instrumentality of a bell crank 115. A spring 117 biases the bell crank to its opposite position, a position wherein the inflow of liquid under pressure is cut off by valve part 119 closing opening from conduit 113 but permitting the escape of fluid from the cup 65 by means of opening 107 and a return pipe 121. The inlet conduit 113 is in communication with inlet passages in parts 31 and 29 (see Fig. 3) and with a pipe line 123 from any suitable source of hydraulic pressure. This pipe line 123 also communicates in a similar way with the lower control element 33 as shown by Fig. 3. The lower control valve is moved by a similar solenoid marked B which, when current is supplied, holds the valve in a position to admit hydraulic pressure. When the current fails or is cut off the valve moves to cut off the inlet of fluid under pressure and to permit escape of the liquid medium from the control element.

The return pipe 121 may carry the fluid to any suitable reservoir.

If the main supply current fails, both solenoids release their hold on their valves and the springs move the valves to positions to permit the discharge of the fluid from the control elements. The springs 61 and 95 associated with the spindles then return the latter to their low speed positions with the result that, subsequently, when current is supplied the motor operates through the transmission in its low ratio position.

It is intended that the lower control element when activated by its solenoid shall be used for high transmission ratios and that it shall be rendered inoperable when driving in low speed ratios. For driving in low speed ratios, the upper control element is used, its solenoid then holding the valve in a position to admit fluid pressure. Mechanism is provided for automatically and abruptly shifting from one to the other of the two control elements. When using the one or the other of the control elements, the ratio may be varied by changing the position of the stop or partition which is engaged by the vane under the influence of the fluid pressure. This variation may be made manually or, and preferably, automatically, as will be explained.

Racks 57 and 83, referred to above, terminate in rollers 125 and 127 for engaging cams 129 and 131 on shaft 133 between which cams is shown a third cam 135. The motor and transmission unit may be considered as used with a lathe. W in Fig. 5 represents a typical example of the work upon which several operations are performed, which operations necessitate changing the rate of rotation of the work. The shaft 133 is to be driven in timed relation to shaft 17 for rotating the work W. This may be done by suitable gearing rotating shaft 133 in timed relation with the lathe or by an electric motor in synchronism therewith. No invention is involved per se in this driving of shaft 133 in timed relation to the work. The cams are shaped to provide for the ratio changes desired during the series of operations upon any one piece of work.

Reference is made to Fig. 9 which shows one way in which the middle cam operates the solenoids. In this figure M is used to represent the motor of the power unit, and S is the switch to open and close the supply of electrical energy to the motor. A branch circuit is represented by a lead c and d is a lever which may be made to contact points e or f acting under the influence of a spring (or its own resiliency) in one direction, and by the cam 135 in the other direction. The return to the main supply line from points e and f when contacted by the lever includes the solenoids A or B, as indicated, and a lead d'.

Fig. 6 shows the three cams in juxtaposed relation with radial lines to show corresponding segments g, h, i, j. It may now be assumed that the cams 129 and 131 are positioned in operative relation to rollers 125 and 127, respectively, and that cam 135 is in operative relation to the lever d. It may be further assumed that the shaft is rotated so that the common segment g is in operative position. In this segment the lever d is free from contact with the cam 135 as indicated by the word "off". The lever d is held resiliently in contact with point e, thus energizing solenoid A. Since solenoid B is not energized, fluid pressure no longer holds the vane on shaft 49 in contact with the partition or stop, and the spring 61 rotates the spindle toward its low ratio position unless and until stopped by the engagement of pin 59 with pin 79, it being remembered that solenoid A is active and that the fluid therein is holding vane 40 in its uppermost ratio position determined by the position of stop 36. During the rotation through this segment g the cam 129 and rack 57 perform no part in the operation. The surface of cam 131 during the progress through this segment operates on rack 83 to control the position of the upper control element 65 with the stop or partition 36, and the fluid pressure, the valve controlled by solenoid A being open, causes the vane to follow the stop. Fig. 6 shows that the surface of cam 131 in this segment is substantially a uniform arc so that the rate of rotation is substantially uniform. That part of the illustrative example in Fig. 7 corresponding to this segment is therefore substantially a straight line, indicating a speed of about 1450 revolutions per minute. This speed is the speed found desirable for the process of turning as shown on the work diagram, Fig. 5, where the character of the lines corresponds to the lines used on Fig. 6 and Fig. 7 to make the disclosure clear.

At the end of the rotation through segment g the segment h assumes the control. The cam surface of cam 135 now engages and rotates lever d to engage point f. Electric current is cut off from solenoid A and springs 95 and 85 swing the housing with its stop and the vane and spindle to "low" position. In the meantime, solenoid B is energized and its vane is rotated to as high a position as may be, that position being determined by its stop or partition carried by the control element 33, the position of the latter determined by rack 57 and cam 129. In this segment cam 131 has a low region and is inoperative while cam 129 has a surface which is not an arc and which therefore produces the progressively lower speeds of rotation through which the work is rotated. It will be observed from Fig. 7 that the speed has been abruptly shifted from some 1450 revolutions at the end of segment g to about 2180 revolutions. This speed is thereafter progressively reduced to about 1500 revolutions in the rotation through this segment as a suitable facing operation is performed upon the work, the variation in speed corresponding to the change in radial distance of the part of the work being operated upon. Again at the end of segment h another abrupt change is required. It is desired during segment i to form a groove in the surface of the work near the periphery requiring a slower rotation. For this purpose the control of the solenoids by the small cam is again shifted. Solenoid B is rendered inoperative and solenoid A for the lower speed ranges becomes effective. The active surface of cam 131 is substantially arcuate resulting in no material speed change during operation through this segment. A speed of some 700 revolutions prevails while the groove is being formed. Then again at the end of segment i a shift is made by the cam 135 to release solenoid A and energize solenoid B. This brings segment j into action. In this segment the cam 129 provides a high speed, some 2400 revolutions, for drilling the central opening shown in the work in Fig. 5.

Upon the completion of the rotation through segments g, h, i, j, the several operations enumerated are completed. The cams are shown to have completed one-half of a complete revolution and are in position to continue in a similar way to perform a similar series (if the second half is like the first as shown) or a different series if other cam outlines are formed.

It will be seen from the above description that the two associated control elements, one for high speeds and one for low speeds, afford quick shifts as indicated by the several vertical lines in Fig. 7, and that, by the addition of the cam control, automatic shifts to one or the other of the control devices may be had together with a predetermined uniform or variable speed through any one segment of rotary motion.

Instead of using the wiring diagram in accordance with Fig. 9, I may use that shown by Fig. 8. In this case the branch circuit through solenoid A is always active whenever the current flows to the motor through the closure of switch S. The make and brake for solenoid B is controlled by the small cam as before. The closure of current through solenoid B renders the high speed control effective. Since the current remains active upon solenoid A, fluid pressure holds vane 40 on stop 36 which stop, however, is at a lower speed ratio position than any to be used while operating with control element 33. Thus since the lower control is operating through a high speed range the upper control element, with the pin 79 removed from the range of movement of pin 59, does not interfere with the action of the lower control element even if the current is then active on solenoid A. Of course, in the event of failure of current, both solenoids release their controls and the springs shift the complete control mechanism to low ratio position.

It should be mentioned also that the inventive idea involving the upper and lower control units is capable of use in the absence of the automatic cam control. In that case one or both rods 57 and 83 may be hand-operated and for convenience I should then prefer to make them rotatable to effect rotation of the pinions 55 and 81. To that end an irreversible worm and worm gear relationship would be used between these parts as shown by Fig. 10 where rotatable shaft 57' is shown with a knob 57" for rotation by hand and having a worm and gear operative connection with shaft 49'.

I claim:

1. In combination with ratio changing transmission including a movable member, a plurality of control elements each having a first part adapted to assume a plurality of positions; and a second part movable under fluid pressure to a position determined by the position of the first part, means whereby a first one of said control elements moves said movable member; the second one being operable through the instrumentality of the second part of the first control element.

2. The invention defined by claim 1 together with a solenoid associated with each of said control elements, an electric circuit and motor to drive said transmission, said solenoids being energized by branch circuits and a rotatable cam whereby the one or the other of said control elements may be operable.

3. The invention defined by claim 1 together with a solenoid associated with each of said control elements, an electric circuit and motor to drive said transmission, said solenoids being energized by branch circuits, a rotatable cam whereby the one or the other of said control elements may be operable, and two other cams rotatable jointly with said first mentioned cam, one of the other cams operable upon the first part of the first control element and the other of said cams upon the first part of the other control element.

4. In combination with a variable speed transmission including a movable member, superposed control elements having coaxial spindles adapted to be rotated each by its own control element, means whereby the control spindle of the lower element may be rotated by the control spindle of the upper control element when the lower control element is inoperative and mechanism whereby the lower spindle moves said movable ratio changing member.

5. The invention defined by claim 4, said means being comprised of engageable pins carried by said spindles.

6. In combination with a variable speed transmission superposed control elements having rotatable coaxial spindles, the spindle of the lower element operably connected to said transmission, means whereby the spindle of the upper element is operable through the spindle of the lower element when the lower control element is out of operation.

7. The invention defined by claim 6, each of said control elements comprising a stop, externally movable means to position said stop, and means carried by said spindle and moved by fluid pressure to engage said stop.

8. The invention defined by claim 6, each of said control elements comprising a stop, externally movable means to position said stop, means carried by said spindle and moved by fluid pressure to engage said stop, and automatically operable means to release the fluid pressure from one of said control elements whereby the other may assume control.

9. In combination with a variable speed transmission, a plurality of superposed control elements each having an externally positioned stop, a rotatable spindle with a vane, movable means to admit and permit the escape of fluid under pressure whereby the vane is forced to engage said stop, and yielding means to swing said vane from said stop when fluid pressure is released, the spindle of the lower element being operatively connected to the transmission mechanism, and cooperating means whereby the spindle of the upper control element may rotate the lower spindle.

10. The invention defined by claim 9 together with pinions on said spindles and racks reciprocable to determine the position of the said stop.

11. The invention defined by claim 9 together with a rotatable shaft, cam means on said shaft to render operable the one or the other of said fluid pressure controlling means whereby the one or the other of said control elements is operable, and other cams rotatable with said first cam, said other cams operable to position said stops.

ALAIN MADLÉ.